United States Patent
Petrzilek et al.

(10) Patent No.: US 10,431,389 B2
(45) Date of Patent: Oct. 1, 2019

(54) SOLID ELECTROLYTIC CAPACITOR FOR HIGH VOLTAGE ENVIRONMENTS

(71) Applicant: AVX Corporation, Fountain Inn, SC (US)

(72) Inventors: Jan Petrzilek, Usti nad Orlici (CZ); Jiri Navratil, Veseli nad Moravou (CZ)

(73) Assignee: AVX Corporation, Fountain Inn, SC (US)

( * ) Notice: Subject to any disclaimer, the term of this patent is extended or adjusted under 35 U.S.C. 154(b) by 0 days.

(21) Appl. No.: 15/810,485

(22) Filed: Nov. 13, 2017

(65) Prior Publication Data

US 2018/0137985 A1  May 17, 2018

Related U.S. Application Data

(60) Provisional application No. 62/421,446, filed on Nov. 14, 2016.

(51) Int. Cl.
| | |
|---|---|
| *H01G 9/00* | (2006.01) |
| *H01G 4/38* | (2006.01) |
| *H01G 9/025* | (2006.01) |
| *H01G 9/052* | (2006.01) |
| *H01G 9/07* | (2006.01) |
| *H01G 9/15* | (2006.01) |
| *H01G 9/028* | (2006.01) |
| *H01G 9/012* | (2006.01) |

(52) U.S. Cl.
CPC ............ *H01G 9/0036* (2013.01); *H01G 4/38* (2013.01); *H01G 9/0032* (2013.01); *H01G 9/025* (2013.01); *H01G 9/028* (2013.01); *H01G 9/052* (2013.01); *H01G 9/07* (2013.01); *H01G 9/15* (2013.01); *H01G 9/012* (2013.01)

(58) Field of Classification Search
CPC .... H01G 9/0036; H01G 9/012; H01G 9/0029; H01G 9/052
See application file for complete search history.

(56) References Cited

U.S. PATENT DOCUMENTS

| | | | | |
|---|---|---|---|---|
| 3,079,308 | A | * | 2/1963 | Ramirez ................ C25D 11/04 204/211 |
| 3,345,545 | A | | 10/1967 | Bourgault et al. |
| 3,440,495 | A | | 4/1969 | Howard et al. |

(Continued)

FOREIGN PATENT DOCUMENTS

| | | |
|---|---|---|
| EP | 0993009 | 4/2000 |
| EP | 1 667 178 A1 | 6/2006 |

(Continued)

OTHER PUBLICATIONS

Pozdeev-Freeman et al., "Critical oxygen content in porous anodes of solid tantalum capacitors," *Journal of Materials Science: Materials in Electronics*, vol. 9, 1998, pp. 309-311.

(Continued)

*Primary Examiner* — Scott B Geyer
(74) *Attorney, Agent, or Firm* — Dority & Manning, P.A.

(57) ABSTRACT

A capacitor element for use in high voltage environments is provided. More particularly, the capacitor element contains an anode that includes a solid electrolyte that overlies an anode. The anode includes a sintered porous pellet and a dielectric layer having a reduced degree of crystallinity formed on a surface of the pellet and within its pores.

13 Claims, 3 Drawing Sheets

(56) References Cited

U.S. PATENT DOCUMENTS

| | | | |
|---|---|---|---|
| 3,581,159 A | 5/1971 | Piper et al. | |
| 3,611,055 A | 10/1971 | Zeppieri et al. | |
| 3,922,773 A | 12/1975 | Marien et al. | |
| 4,085,435 A | 4/1978 | Galvagni | |
| 4,479,168 A | 10/1984 | Green, Jr. | |
| 4,508,563 A | 4/1985 | Bernard et al. | |
| 4,755,908 A | 7/1988 | Gardner | |
| 4,910,645 A | 3/1990 | Jonas et al. | |
| 4,936,957 A * | 6/1990 | Dickey | C25D 11/12 204/229.3 |
| 4,945,452 A | 7/1990 | Sturmer et al. | |
| 4,959,430 A | 9/1990 | Jonas et al. | |
| 5,111,327 A | 5/1992 | Blohm et al. | |
| 5,198,968 A | 3/1993 | Galvagni | |
| 5,300,575 A | 4/1994 | Jonas et al. | |
| 5,314,606 A | 5/1994 | Irie et al. | |
| 5,357,399 A | 10/1994 | Salisbury | |
| 5,369,547 A | 11/1994 | Evans | |
| 5,394,295 A | 2/1995 | Galvagni et al. | |
| 5,457,862 A | 10/1995 | Sakata et al. | |
| 5,473,503 A | 12/1995 | Sakata et al. | |
| 5,495,386 A | 2/1996 | Kulkarni | |
| 5,560,761 A | 10/1996 | Naito | |
| 5,586,000 A | 12/1996 | Sakata et al. | |
| 5,608,261 A | 3/1997 | Bhattacharyya et al. | |
| 5,638,253 A | 6/1997 | Hasegawa | |
| 5,694,287 A | 12/1997 | Nishiyama et al. | |
| 5,716,511 A | 2/1998 | Melody et al. | |
| 5,729,428 A | 3/1998 | Sakata et al. | |
| 5,812,367 A | 9/1998 | Kudoh et al. | |
| 5,914,386 A | 6/1999 | Berendse et al. | |
| 5,949,639 A | 9/1999 | Maeda et al. | |
| 5,951,840 A | 9/1999 | Fukaumi et al. | |
| 6,052,273 A | 4/2000 | Inoue et al. | |
| 6,149,793 A * | 11/2000 | Melody | C25D 11/02 205/234 |
| 6,162,345 A | 12/2000 | Kinard et al. | |
| 6,168,639 B1 * | 1/2001 | Taketani | H01G 9/0036 205/80 |
| 6,191,936 B1 | 2/2001 | Webber et al. | |
| 6,197,252 B1 | 3/2001 | Bishop et al. | |
| 6,238,444 B1 | 3/2001 | Cadwallader | |
| 6,231,993 B1 | 5/2001 | Stephenson et al. | |
| 6,261,434 B1 | 7/2001 | Melody et al. | |
| 6,262,877 B1 | 7/2001 | Mosley | |
| 6,267,861 B1 | 7/2001 | Kinard et al. | |
| 6,322,912 B1 | 11/2001 | Fife | |
| 6,346,185 B1 | 2/2002 | Kinard et al. | |
| 6,350,406 B1 | 2/2002 | Satou et al. | |
| 6,369,239 B2 | 4/2002 | Rauchschwalbe et al. | |
| 6,391,275 B1 | 5/2002 | Fife | |
| 6,416,730 B1 | 7/2002 | Fife | |
| 6,445,566 B2 | 9/2002 | Watanabe et al. | |
| 6,447,570 B1 | 9/2002 | Pozdeev-Freeman | |
| 6,480,371 B1 * | 11/2002 | Kinard | C25D 11/26 252/62.2 |
| 6,527,937 B2 | 3/2003 | Fife | |
| 6,528,662 B2 | 3/2003 | Jonas | |
| 6,540,900 B1 * | 4/2003 | Kinard | C25D 11/06 205/153 |
| 6,576,099 B2 | 6/2003 | Kimmel et al. | |
| 6,592,740 B2 | 7/2003 | Fife | |
| 6,594,140 B1 | 7/2003 | Evans et al. | |
| 6,635,729 B1 | 10/2003 | Groenendaal et al. | |
| 6,639,787 B2 | 10/2003 | Kimmel et al. | |
| 6,674,635 B1 | 1/2004 | Fife et al. | |
| 6,756,473 B2 | 6/2004 | Reuter et al. | |
| 6,786,951 B2 | 9/2004 | He et al. | |
| 6,798,644 B1 | 9/2004 | Piller et al. | |
| 6,802,951 B2 * | 10/2004 | Hossick-Schott | C25D 5/18 205/108 |
| 6,804,109 B1 | 10/2004 | Hahn et al. | |
| 6,891,016 B2 | 5/2005 | Reuter et al. | |
| 6,987,663 B2 | 1/2006 | Merker et al. | |
| 7,090,762 B2 | 8/2006 | Tripp et al. | |
| 7,102,016 B2 | 9/2006 | Reuter | |
| 7,116,548 B2 | 10/2006 | Satterfield, Jr. et al. | |
| 7,118,690 B2 | 10/2006 | Wessling et al. | |
| 7,150,776 B2 | 12/2006 | Shekhter et al. | |
| 7,154,740 B2 | 12/2006 | Merker et al. | |
| 7,169,284 B1 | 1/2007 | Jiang et al. | |
| 7,220,397 B2 | 5/2007 | Kimmel et al. | |
| 7,221,554 B2 | 5/2007 | Brenneman et al. | |
| 7,248,462 B2 | 7/2007 | Melody et al. | |
| 7,256,982 B2 | 8/2007 | Lessner et al. | |
| 7,259,061 B2 | 8/2007 | Kundalgurki | |
| 7,262,511 B2 | 8/2007 | Osako et al. | |
| 7,279,015 B2 | 10/2007 | Merker | |
| 7,304,832 B2 | 12/2007 | Ushio et al. | |
| 7,312,979 B2 | 12/2007 | Ishizuka et al. | |
| 7,341,705 B2 | 3/2008 | Schnitter | |
| 7,341,801 B2 | 3/2008 | Reuter et al. | |
| 7,358,326 B2 | 4/2008 | Heuer et al. | |
| 7,377,947 B2 | 5/2008 | Merker et al. | |
| 7,381,396 B2 | 6/2008 | Thomas et al. | |
| 7,411,779 B2 | 8/2008 | Merker et al. | |
| 7,419,926 B2 | 9/2008 | Schnitter et al. | |
| 7,449,588 B2 | 11/2008 | Jonas et al. | |
| 7,483,260 B2 | 1/2009 | Ziarniak et al. | |
| 7,515,396 B2 | 4/2009 | Biler | |
| 7,544,218 B2 | 6/2009 | Norton et al. | |
| 7,554,793 B2 | 6/2009 | Chacko | |
| 7,563,290 B2 | 7/2009 | Qiu et al. | |
| 7,582,958 B2 | 9/2009 | Brailey | |
| 7,585,983 B2 | 9/2009 | Reuter et al. | |
| 7,667,954 B2 | 2/2010 | Lessner et al. | |
| 7,678,259 B2 | 3/2010 | Melody et al. | |
| 7,679,885 B2 | 3/2010 | Mizusaki et al. | |
| 7,688,571 B2 | 3/2010 | Ishizuka et al. | |
| 7,697,265 B2 | 4/2010 | Umemoto et al. | |
| 7,727,372 B2 | 6/2010 | Liu et al. | |
| 7,731,893 B2 | 6/2010 | Freeman et al. | |
| 7,750,099 B2 | 7/2010 | Chikusa et al. | |
| 7,785,493 B2 | 8/2010 | Jonas et al. | |
| 7,879,217 B2 | 2/2011 | Goad et al. | |
| 7,883,796 B2 | 2/2011 | Kida et al. | |
| 7,948,069 B2 | 5/2011 | Zhuang | |
| 7,952,853 B2 | 5/2011 | Viste et al. | |
| 7,972,534 B2 | 7/2011 | Merker et al. | |
| 7,973,180 B2 | 7/2011 | Morita et al. | |
| 7,990,683 B2 | 8/2011 | Qiu et al. | |
| 7,994,345 B2 | 8/2011 | Brassat et al. | |
| 8,058,135 B2 | 11/2011 | Merker et al. | |
| 8,094,434 B2 | 1/2012 | Rawal et al. | |
| 8,194,395 B2 | 6/2012 | Zednicek et al. | |
| 8,203,827 B2 | 6/2012 | Karnik | |
| 8,279,584 B2 | 10/2012 | Zednickova | |
| 8,310,815 B2 | 11/2012 | Freeman et al. | |
| 8,313,538 B2 | 11/2012 | Merker et al. | |
| 8,313,621 B2 | 11/2012 | Goad et al. | |
| 8,323,361 B2 | 12/2012 | Freeman et al. | |
| 8,349,030 B1 | 1/2013 | Hussey et al. | |
| 8,355,242 B2 | 1/2013 | Vilc et al. | |
| 8,456,803 B2 | 6/2013 | Merker et al. | |
| 8,477,479 B2 | 7/2013 | Pease et al. | |
| 8,663,505 B2 | 3/2014 | Loevenich et al. | |
| 8,675,348 B2 | 3/2014 | Viste et al. | |
| 8,687,347 B2 | 4/2014 | Bates et al. | |
| 8,696,768 B2 | 4/2014 | Merker et al. | |
| 8,721,929 B2 | 5/2014 | Loevenich et al. | |
| 8,780,530 B2 | 7/2014 | Zednicek et al. | |
| 8,808,403 B2 | 8/2014 | Qiu et al. | |
| 8,824,122 B2 | 9/2014 | Vilc et al. | |
| 8,882,856 B2 | 11/2014 | Intelmann et al. | |
| 8,936,735 B2 | 1/2015 | Guntermann et al. | |
| 9,053,854 B2 | 6/2015 | Petrzilek et al. | |
| 9,105,401 B2 | 8/2015 | Dreissig et al. | |
| 9,236,192 B2 | 1/2016 | Biler et al. | |
| 9,251,961 B2 | 2/2016 | Merker et al. | |
| 9,384,901 B2 | 7/2016 | Weaver | |
| 9,620,293 B2 | 4/2017 | Djebara et al. | |
| 9,620,294 B2 | 4/2017 | Djebara et al. | |
| 9,786,440 B2 | 10/2017 | Weaver et al. | |

(56) References Cited

U.S. PATENT DOCUMENTS

| | | | |
|---|---|---|---|
| 2003/0111247 A1 | 6/2003 | Araki et al. | |
| 2004/0243183 A1 | 12/2004 | Norton et al. | |
| 2005/0065352 A1 | 3/2005 | Brassat et al. | |
| 2006/0191796 A1* | 8/2006 | Muffoletto | C25D 11/04 205/102 |
| 2006/0260713 A1 | 11/2006 | Pyszczek et al. | |
| 2009/0090997 A1* | 4/2009 | Naito | H01G 9/0036 257/532 |
| 2009/0180239 A1* | 7/2009 | Oh | H01G 9/025 361/523 |
| 2009/0279233 A1 | 11/2009 | Freeman et al. | |
| 2009/0310285 A1 | 12/2009 | Reuter et al. | |
| 2010/0148124 A1 | 6/2010 | Reuter et al. | |
| 2010/0316862 A1 | 12/2010 | Puppe et al. | |
| 2012/0091399 A1 | 4/2012 | Guntermann et al. | |
| 2013/0182375 A1* | 7/2013 | Naito | H01G 9/0036 361/528 |
| 2016/0148757 A1 | 5/2016 | Djebara et al. | |
| 2017/0263384 A1 | 9/2017 | Naito et al. | |
| 2018/0133493 A1 | 5/2018 | Petrzilek et al. | |
| 2018/0137985 A1 | 5/2018 | Petrzilek et al. | |

FOREIGN PATENT DOCUMENTS

| | | |
|---|---|---|
| GB | 1069685 | 8/1965 |
| WO | WO 2008/003938 | 1/2008 |
| WO | WO 2010/089111 | 8/2010 |
| WO | WO 2010/102751 | 9/2010 |
| WO | WO 2012/041506 | 4/2012 |
| WO | WO 2012/041507 | 4/2012 |
| WO | WO 2012/048823 | 4/2012 |
| WO | WO 2012/048824 | 4/2012 |
| WO | WO 2012/119711 | 9/2012 |
| WO | WO 2012/136305 | 10/2012 |
| WO | WO 2013/186970 | 12/2013 |

OTHER PUBLICATIONS

International Search Report and Written Opinion PCT/US2017/061430 dated Feb. 28, 2018, 13 pages.
Abstract of Japanese Patent No. JP1140621 dated Jun. 1, 1989.
Abstract of Japanese Patent No. JP 3109712 dated May 9, 1991.
Abstract of Japanese Patent No. JP3109713 dated May 9, 1991.
Abstract of Japanese Patent No. JP3109714 dated May 9, 1991.
Abstract of Japanese Patent No. JPH03127813 dated May 30, 1991, 1 page.
Abstract of Japanese Patent No. JP2001258130 dated Sep. 21, 2001, 2 pages.
Abstract of Japanese Patent No. 2010090397 dated Apr. 22, 2010, 1 page.
Abstract of WO Patent No. 2010/015468 dated Feb. 11, 2010, 1 page.
Machine Translation of JP2005217129.
Machine Translation of JP2006278875.
Machine Translation of JP2005039168.
Article—Balaji et al., "Sintering, and properties of tantalum anodes for capacitor applications," *Materials Letters*, vol. 56. 2002. pp. 560-563.
Article—Freeman et al., "Critical oxygen content in porous anodes of solid tantalum capacitors," *Journal of Materials Science: Materials in Electronics*, vol. 9, 1998. pp. 309-311.
Paper—Freeman et al., "Electrical Characterization at Polymer Tantalum Capacitors with Poly(3,4-Ethylenedioxythiophene) Cathode." Journal of the Electrochemical Society, vol. 156, No. 6, 2009, 10 pages and CARTS Europe 2008, Helsinki. Finland. Oct. 20-23, 2008.
Paper—Freeman et al., "How Far We Can Go with Hi CV Ta Capacitors," CARTS Europe 2004, 18th Annual Passive Components Conference. Oct. 18-21, 2004.
Paper—Freeman et al. "How High Workirig Voltage Can Go in Polymer Tantalum Capacitors," CARTS USA 2011, Jacksonville, Florida, Mar. 28-31, 2011, 15 pages.
Paper—Freetman et al., "Lou Voltage CV Loss in Tantalum Capacitors," CARTS USA 2010, New Orleans, LA, Mar. 16, 2010. 12 pages.
Paper—Freeman et al., "Reliability and Critcal Applications of Tantalum Capacitors," CARTS Europe 2007 Symposium, Oct.-Nov. 2007, Barcelona. Spain. pp. 193-204.
Paper—Freeman. el al., "Stable. Reliable. and Efficient Tantalum Capacitors," CARTS USA 2008, 28th Symposium, for Passive Electronics, March, Newport Beach, California, 6 pages.
Paper—Merker et al., "Conducting, Polymer Dispersions for High-Capacitance Tantalum Capacitors": CARTS Europe 2006, Sep. 2006. Bad Homburg, Germany, 6 pages.
Paper—Merker et al., "New Conducting Polymer Dispersions for Solid Electrolytic Capacitors," CARTS Europe 2005. Oct. 17-20, 2005, Prague, CZ Republic, 6 pages.
Paper—Merker et al., "Tuning Conducting, Polymer Dispersions for High-CV Tantalum Capacitors," CARTS Europe Oct. 29-Nov. 1, 2007, Barcelona. Spain, 6 pages.
Paper, Petrzilck et al., "Next Generation of High Voltage, Low ESR Trantalum Conductive Polymer Capacitors," CARTS Europe 2010. Munich. Germany, Nov. 10-11. 2010.
Paper—Simkins. et al., "Tantalum Powders for High Voltage Applications II," CARTS 2004, 24th Annual Capacitor and Resistor Technology Symposium. Mar. 29-Apr. 1, pp. 47-54.
Paper—Simpson et al., "Advances and Applications of Inherently Conductive Polymer Technologies Based on Poly(3,4-Ethylenedioxythiophene)," 2005 AIMCAL Fall Technical Conference and 19th International Vacuum Web Coating Conference, Oct. 16-20, 2005, Session 5: Advances in Technology, Myrtle Beach, SC, 10 pages.
Paper—Young et al., "High Voltage Tantalum Polymer Capacitors," CARTS Europe 2008, Helsinki, Finland, Oct. 20-23, 2008.
Paper—Young et al., "Performance and Reliability Study of High Voltage Tantalum Polymer Capacitors," 2010 Electronic Components Association, Inc., Arlington, VA: CARTS 2010 Conference Proceedings, CARTS 2010 Conference, New Orleans, LA, Apr. 2010, 13 pages.
Presentation—Freeman et al., "Hermetically Sealed Polymer Tantalum Capacitors," CMSE Europe 2010.
Thesis—Githin Francis Alapatt, "Investigating Pre-Breakdown Currents in Polymer Tantalum Capacitors," Aug. 2010, Clemson University, 102 pages.
Thesis—Brian Holman, "The Electrical Characterization of Tantalum Capacitors as MIS Devices," Aug. 2008, Clemson University, 128 pages.
Product Information for Tantalum Polymer Through-Hole Capacitors, T550 Polymer Hermetic Seal (PHS) Series from Kemet, 2011, 2 pages.

\* cited by examiner

SOLID ELECTROLYTIC CAPACITOR FOR HIGH VOLTAGE ENVIRONMENTS

CROSS REFERENCE TO RELATED APPLICATION

The present application claims filing benefit of U.S. Provisional Patent Application Ser. No. 62/421,446 having a filing date of Nov. 14, 2016, and which is incorporated herein by reference in its entirety.

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors may be formed by pressing a metal powder (e.g., tantalum) around a metal lead wire, sintering the pressed part, anodizing the sintered anode, and thereafter applying a solid electrolyte. Unfortunately, however, it has traditionally been difficult to form the dielectric layers of such capacitors at the high voltages often required in high voltage power distribution systems. For example, most formation processes require that a current is applied to the anodizing solution in a decreasing, stepwise fashion for a relatively long period of time (e.g., over 600 minutes) to achieve the desired voltage level. The present inventors have found, however, that overheating often occurs during such a process, which can lead to cracking in the dielectric and also result in a dramatic increase in the leakage current exhibited by the capacitor.

As such, a need currently exists for a solid electrolytic capacitor having improved performance in very high voltage environments.

SUMMARY OF THE INVENTION

In accordance with one embodiment of the present invention, a capacitor element is disclosed that comprises an anode and a solid electrolyte overlying the anode. The anode comprises a pellet formed from a pressed and sintered valve metal powder, wherein a dielectric layer is formed on the pellet that has no more than about 1,000 crystals per square millimeter or less. In another embodiment of the present invention, a capacitor is disclosed that comprises a capacitor element, such as described above, an anode termination that is in electrical connection with the anode body, a cathode termination that is in electrical connection with the solid electrolyte, a resinous casing that encapsulates the capacitor element and leaves exposed at least a portion of the anode termination and the cathode termination.

In accordance with yet another embodiment of the present invention, a method of forming a high voltage solid electrolytic capacitor element is disclosed that comprises subjecting a sintered anode pellet to a formation profile to form an anode, wherein the formation profile includes subjecting the pellet to an increasing current so that a target forming voltage is achieved in about 30 minutes or less, and applying a solid electrolyte to the anode.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor element for use in high voltage environments, such as at rated voltages of about about 75 volts or more, in some embodiments about 100 volts or more, and in some embodiments, from about 110 volts to about 200 volts. More particularly, the capacitor element contains an anode that includes a solid electrolyte that overlies an anode. The anode includes a sintered porous pellet and a dielectric layer formed on a surface of the pellet and within its pores. The present inventors have discovered that the ability to achieve such high voltages can be achieved through the use of a dielectric having a reduced degree of crystallinity. Namely, the dielectric typically has about 1,000 crystals per square millimeter or less, in some embodiments about 500 crystals per square millimeter or less, and in some embodiments, from 0 to about 100 crystals per square millimeter.

Figure 2:
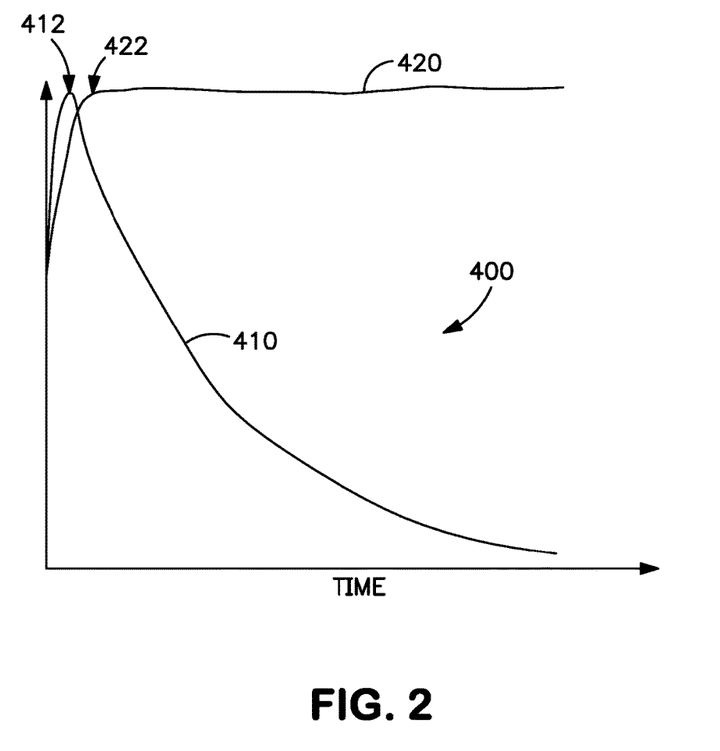
FIG. 2 is a graphical illustration of one embodiment of a formation profile that may be employed in the present invention.

While the exact mechanism is not fully understood, it is believed that such a low crystalline dielectric can be achieved by selectively controlling the formation profile so that the anode is subjected to a rapidly increasing current over a relatively short period of time until the target forming voltage (i.e., peak voltage) is achieved. Referring to FIG. 2, for example, one embodiment of a suitable formation profile 400 that may be employed in the present invention is shown. As illustrated, the formation profile 400 includes the application of a current 410 at a rapidly increasing rate until a peak current 412 is reached. The peak current 412 may, for instance, range from about 1000 to about 6000 milliamps, in some embodiments from about 1500 to about 5000 milliamps, and in some embodiments, from about 2500 to about 4000 milliamps. Notably, the peak current 412 can be reached in only a short period of time, such as about 30 minutes or less, in some embodiments about 20 minutes or less, and in some embodiments, from about 1 to about 15 minutes.

As the current 410 increases, the voltage 420 is also increased until a target forming voltage 422 is reached, which typically ranges from about 100 to about 500 volts, in some embodiments from about 150 to about 400 volts, and in some embodiments, from about 180 to about 300 volts. As with the peak current 412, the target forming voltage 422 is also reached in only a short period of time, such as about 30 minutes or less, in some embodiments about 20 minutes or less, and in some embodiments, from about 1 to about 15 minutes. After reaching the peak current value and target forming voltage, the current may then be reduced while the forming voltage is held at a relatively constant level to allow the thickness of the dielectric layer to continue to build. As shown in FIG. 2, for instance, the current 410 may be reduced at a non-linear rate (e.g., negative exponential rate) and/or the voltage 420 may be held relatively constant for a period of time ranging from about 20 minutes to about 300 minutes, in some embodiments from about 50 minutes to about 280 minutes, and in some embodiments, from about 100 minutes to about 250 minutes. In this manner, the total formation time is only typically from about 20 minutes to about 300 minutes, in some embodiments from about 50 minutes to about 280 minutes, and in some embodiments, from about 100 minutes to about 250 minutes.

Various embodiments of the present invention will now be described in more detail.

I. Capacitor Element

A. Pellet

The pellet is formed from a valve metal powder that contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal powder may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. The niobium oxide may be $NbO_{0.7}$, $NbO_{1.0}$, $NbO_{1.1}$, and $NbO_2$.

The powder may be formed using any of a variety of processes known in the art, such as electron beam melting, reduction, etc. A tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with an alkali reducing agent (e.g., sodium).

In yet other embodiments, the powder may also be formed by reacting an oxide of a valve metal compound with a reducing agent that contains a metal having a relatively high oxidation state (e.g., magnesium). The valve metal oxide is typically a tantalum and/or niobium oxide capable of being reduced, such as $Ta_2O_x$ ($x\leq5$) (e.g., $Ta_2O_5$) or $Nb_2O_x$ ($x\leq5$) (e.g., $Nb_2O_5$). The reducing agent may be provided in a gaseous, liquid, or solid state, and may also be in the form of the metal, as well as alloys or salts thereof. In one embodiment, for instance, a halide salt (e.g., chloride, fluoride, etc.) may be employed. If desired, other components may also be added before, during, or after the reaction, such as dopants, alkali metals, etc. The reduction of the oxide is typically carried out at a temperature of from about 400° C. to about 1200° C., and in some embodiments, from about 600° C. to about 1000° C., for about 20 to about 300 minutes. Heating may be carried out in a reactor under an inert atmosphere (e.g., argon or nitrogen atmosphere) so that a molten bath is formed. Suitable reactors may include, for instance, vertical tube furnaces, rotary kilns, fluid bed furnaces, multiple hearth furnaces, self-propagation high-temperature synthesis reactors, etc. The reactor may be maintained under inert gas until that the mass in the reaction vessel is cooled to ambient temperature. Additional details of such a reduction reaction may be described in U.S. Patent Publication Nos. 2003/0110890 to He, et al. and 2004/0163491 to Shekhter, et al. After the reduction, the product may be cooled, crushed, and washed to remove excess impurities or reactants.

The resulting powder may be a free-flowing, finely divided powder that contains primary particles having any of a variety of shapes, such as a relatively flat shape (e.g., flakes) or three-dimensional shape (e.g., nodular or angular). When three-dimensional particles are employed, such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. The powder may also have a relatively high specific surface area, such as about 1 square meter per gram ("$m^2/g$") or more, in some embodiments about 2 $m^2/g$ or more, and in some embodiments, from about 4 to about 30 $m^2/g$. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas. The test may be conducted with a MONO-SORB® Specific Surface Area Analyzer available from QUANTACHROME Corporation, Syosset, N.Y., which measures the quantity of adsorbate nitrogen gas adsorbed on a solid surface by sensing the change in thermal conductivity of a flowing mixture of adsorbate and inert carrier gas (e.g., helium).

The primary particles of the powder may also have a median size (D50) of from about 5 to about 250 nanometers, and in some embodiments, from about 10 to about 100 nanometers, such as using a laser particle size distribution analyzer made by BECKMAN COULTER Corporation (e.g., LS-230), optionally after subjecting the particles to an ultrasonic wave vibration of 70 seconds. Due to its high surface area and low particle size, the powder may have a high specific charge, such as greater than about 5,000 microFarads*Volts per gram ("$\mu F*V/g$"), in some embodiments from about 10,000 to about 80,000 $\mu F*V/g$, and in some embodiments, from about 15,000 to about 45,000 $\mu F*V/g$. As is known in the art, the specific charge may be determined by multiplying capacitance by the anodizing voltage employed, and then dividing this product by the weight of the anodized electrode body.

The powder (as well as the anode) may also have a relatively low alkali metal, carbon, and oxygen content. For example, the powder may have no more than about 50 ppm carbon or alkali metals, and in some embodiments, no more than about 10 ppm carbon or alkali metals. Likewise, the powder may have no more than about 0.15 ppm/$\mu C/g$ oxygen, and in some embodiments, no more than about 0.10 ppm/$\mu C/g$ oxygen. Oxygen content may be measured by LECO Oxygen Analyzer and includes oxygen in natural oxide on the tantalum surface and bulk oxygen in the tantalum particles. Bulk oxygen content is controlled by period of crystalline lattice of tantalum, which is increasing linearly with increasing oxygen content in tantalum until the solubility limit is achieved. This method was described in "Critical Oxygen Content In Porous Anodes Of Solid Tantalum Capacitors", Pozdeev-Freeman et al., Journal of Materials Science: Materials In Electronics 9, (1998) 309-311 wherein X-ray diffraction analysis (XRDA) was employed to measure period of crystalline lattice of tantalum. Oxygen in sintered tantalum anodes may be limited to thin natural surface oxide, while the bulk of tantalum is practically free of oxygen.

To facilitate the construction of the anode, certain additional components may also be included in the powder. For example, the powder may be optionally mixed with a binder and/or lubricant to ensure that the particles adequately adhere to each other when compacted or pressed to form the pellet. Suitable binders may include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoroolefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead wire. The wire may be formed from any electrically conductive material, such as tantalum, niobium, aluminum, hafnium, titanium, etc., as well as electrically conductive oxides and/or nitrides of thereof.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 800° C. to about 2000° C., in some embodiments from about 1200° C. to about 1800° C., and in some embodiments, from about 1500° C. to about 1700° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Upon sintering, the pellet shrinks due to the growth of metallurgical bonds between the particles. Because shrinkage generally increases the density of the pellet, lower press densities ("green") may be employed to still achieve the desired target density. For example, the target density of the pellet after sintering is typically from about 5 to about 8 grams per cubic centimeter. As a result of the shrinking phenomenon, however, the pellet need not be pressed to such high densities, but may instead be pressed to densities of less than about 6.0 grams per cubic centimeter, and in some embodiments, from about 4.5 to about 5.5 grams per cubic centimeter. Among other things, the ability to employ lower green densities may provide significant cost savings and increase processing efficiency.

As noted above, an anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

B. Dielectric Layer

As indicated above, the anode also contains a dielectric layer formed by anodically oxidizing ("anodizing") the sintered anode pellet. For example, a tantalum (Ta) anode may be anodized to tantalum pentoxide ($Ta_2O_5$). Typically, anodization is performed by initially applying an electrolyte to the pellet, such as by dipping the pellet into the electrolyte. A current is thereafter passed through the electrolyte to form the dielectric layer in the manner described above. The temperature at which the anodic oxidation process is conducted may vary as desired, but is typically from about 10° C. to about 200° C., in some embodiments from about 20° C. to about 150° C., and in some embodiments, from about 25° C. to about 90° C.

The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 10 mS/cm or more, and in some embodiments, from about 20 mS/cm to about 100 mS/cm, determined at a temperature of 25° C. To enhance the electrical conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

C. Solid Electrolyte

As indicated above, a solid electrolyte overlies the dielectric that generally functions as the cathode for the capacitor element. The solid electrolyte typically contains a conductive polymer, which is typically 7-conjugated and has electrical conductivity after oxidation or reduction, such as an electrical conductivity of at least about 1 μS/cm. Examples of such 7-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al., describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

Various methods may be utilized to form the conductive polymer layer. For example, an in situ polymerized layer may be formed by chemically polymerizing monomers in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

The oxidative catalyst and monomer may be applied either sequentially or together to initiate the polymerization reaction. Suitable application techniques for applying these components include screen-printing, dipping, electrophoretic coating, and spraying. As an example, the monomer may initially be mixed with the oxidative catalyst to form a precursor solution. Once the mixture is formed, it may be applied to the anode part and then allowed to polymerize so that a conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

In addition to in situ application, the conductive polymer solid electrolyte may also be applied in the form of a dispersion of conductive polymer particles. One benefit of employing a dispersion is that it may minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage." To enable good impregnation of the anode, the particles employed in the dispersion typically have a small size, such as an average size (e.g., diameter) of from about 1 to about 200 nanometers, in some embodiments from about 2 to about 100 nanometers, and in some embodiments, from about 5 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor element. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion also generally contains a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization. In addition to conductive polymer(s) and counterion(s), the dispersion may also contain one or more binders, dispersion agents, fillers, adhesives, crosslinking agents, etc.

The polymeric dispersion may be applied using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and/or washed. One or more additional layers may also be formed in this manner to achieve the desired thickness. Typically, the total thickness of the layer(s) formed by this particle dispersion is from about 1 to about 50 μm, and in some embodiments, from about 5 to about 20 μm. The weight ratio of counterions to conductive polymers is likewise from about 0.5:1 to about 50:1, in some embodiments from about 1:1 to about 30:1, and in some embodiments, from about 2:1 to about 20:1.

If desired, a hydroxyl-functional nonionic polymer may also be included in the solid electrolyte. The term "hydroxyfunctional" generally means that the compound contains at least one hydroxyl functional group or is capable of possessing such a functional group in the presence of a solvent. Without intending to be limited by theory, it is believed that hydroxy-functional nonionic polymers can improve the degree of contact between the conductive polymer and the surface of the internal dielectric, which is typically relatively smooth in nature as a result of higher forming voltages. This unexpectedly increases the breakdown voltage and wet-to-dry capacitance of the resulting capacitor. Furthermore, it is believed that the use of a hydroxy-functional polymer with a certain molecular weight can also minimize the likelihood of chemical decomposition at high voltages. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—OH (e.g., octaethylene glycol monododecyl ether and pentaethylene glycol monododecyl ether); polyoxypropylene glycol alkyl ethers having the general formula: $CH_3$—$(CH_2)_{10\text{-}16}$—$(O$—$C_3H_6)_{1\text{-}25}$—OH; polyoxyethylene glycol octylphenol ethers having the following general formula: $C_8H_{17}$—$(C_6H_4)$—$(O$—$C_2H_4)_{1\text{-}25}$—OH (e.g., Triton™ X-100); polyoxyethylene glycol alkylphenol ethers having the following general formula: $C_9H_{19}$—$(C_6H_4)$—$(O$—$C_2H_4)_{1\text{-}25}$—OH (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

The hydroxy-functional nonionic polymer may be incorporated into the solid electrolyte in a variety of different ways. In certain embodiments, for instance, the nonionic polymer may simply be incorporated into any conductive polymer layer(s) formed by a method as described above (e.g., in situ polymerization or pre-polymerized particle dispersion). In other embodiments, however, the nonionic polymer may be applied after the initial polymer layer(s) are formed.

D. Cathode Coating

If desired, the capacitor element may also contain a cathode coating that overlies the solid electrolyte and includes at least one carbonaceous layer and/or at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc.

E. Other Layers

Although not required, an external polymer coating may be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor element to increase the adhesion to the dielectric and result in a more mechanically robust part, which may reduce equivalent series resistance and leakage current. If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc.

The capacitor element may also contain other layers. For example, a protective coating may optionally be formed between the dielectric and solid electrolyte, such as one made of a relatively insulative resinous material (natural or synthetic), such as shellac resins. These and other protective coating materials are described in more detail U.S. Pat. No. 6,674,635 to Fife, et al. If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

II. Terminations

The capacitor may also be provided with terminations, particularly when employed in surface mounting applications. For example, the capacitor may contain an anode termination to which the anode of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring again to FIG. 1, for example, the electrolytic capacitor 30 is shown as including an anode termination 62 and a cathode termination 72 in electrical connection with the capacitor element 33. The capacitor element 33 has an upper surface 37, lower surface 39, front surface 36, and rear surface 38. Although it may be in electrical contact with any of the surfaces of the capacitor element 33, the cathode termination 72 in the illustrated embodiment is in electrical contact with the lower surface 39 via a conductive adhesive (not shown). More specifically, the cathode termination 72 contains a first component 73 that is in electrical contact and generally parallel with the lower surface 39 of the capacitor element 33. The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. The region 51 may possess a "U-shape" to further enhance surface contact and mechanical stability of the lead 16.

Figure 1:
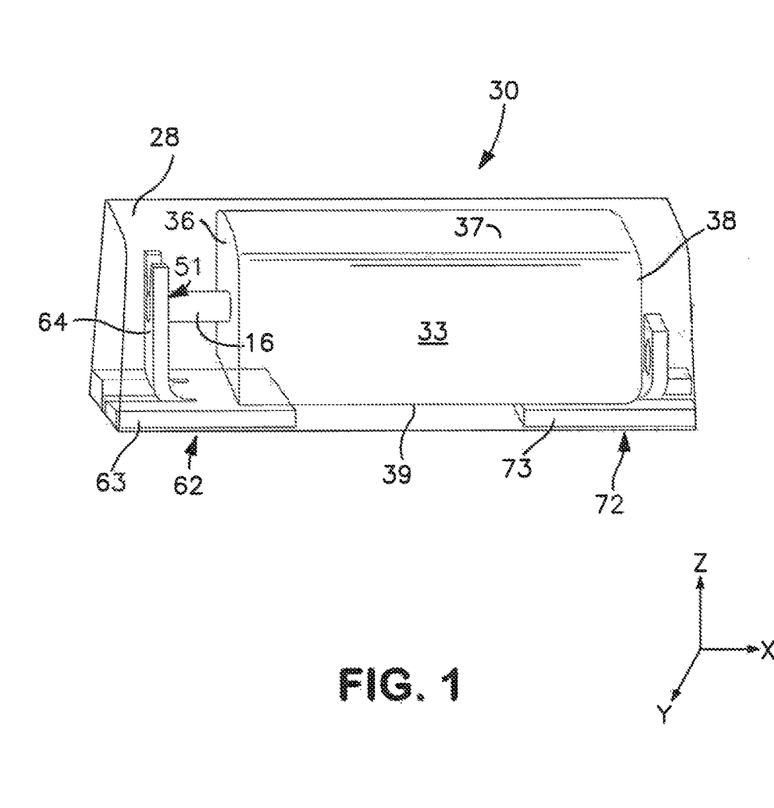
FIG. 1 is a schematic illustration of one embodiment of a capacitor that may be formed in accordance with the present invention.

The terminations may be connected to the capacitor element using any technique known in the art. In one embodiment, for example, a lead frame may be provided that defines the cathode termination 72 and anode termination 62. To attach the electrolytic capacitor element 33 to the lead frame, the conductive adhesive (not shown) may initially be applied to a surface of the cathode termination 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 is initially bent upward to the position shown in FIG. 1. Thereafter, the capacitor element 33 is positioned on the cathode termination 72 so that its lower surface 39 contacts the adhesive 90 and the anode lead 16 is received by the region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

III. Casing

The capacitor element is generally encapsulated within a casing so that at least a portion of the anode and cathode terminations are exposed for mounting onto a circuit board. As shown in FIG. 1, for instance, the capacitor element 33 is encapsulated within a resinous casing 28 so that a portion of the anode termination 62 and a portion of the cathode termination 72 are exposed. The casing is typically formed from a thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof.

As a result of the present invention, the resulting capacitor is able to be employed in high voltage applications. The capacitor may, for example, exhibit a relatively high "breakdown voltage" (voltage at which the capacitor fails), such as about 120 volts or more, in some embodiments about 175 volts or more, in some embodiments about 200 volts or more, and in some embodiments, from about 240 volts to about 300 volts. Likewise, the capacitor may also be able to withstand relatively high surge currents, which is also common in high voltage applications. The peak surge current may be, for example, about 100 Amps or more, in some embodiments about 200 Amps or more, and in some embodiments, and in some embodiments, from about 300 Amps to about 800 Amps.

The capacitor may also exhibit excellent electrical properties even when exposed to high temperature environments. For example, the capacitor may have an equivalence series resistance ("ESR") of less than about 50 ohms, in some embodiments less than about 25 ohms, in some embodiments from about 0.01 to about 10 ohms, and in some embodiments, from about 0.05 to about 5 ohms, measured at an operating frequency of 100 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 µA/µF*V, in some embodiments less than about 0.5 µA/µF*V, and in some embodiments, less than about 0.1 µA/µF*V, where µA is microamps and uF*V is the product of the capacitance and the rated voltage. Such ESR and normalized leakage current values may even be maintained after aging for a substantial amount of time at high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at temperatures ranging from about 50° C. to about 250° C., and, in some embodiments from about 70° C. to about 225° C., and in some embodiments, from about 100° C. to about 225° C. (e.g., 100° C., 125° C., 150° C., 175° C., or 200° C.).

The capacitor may also exhibit a high energy density that enables it suitable for use in high pulse applications. Energy density is generally determined according to the equation $E=\frac{1}{2}*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at an operating frequency of 120 Hz and a temperature of 25° C. For example, the capacitor may exhibit an energy density of about 2.0 joules per cubic centimeter ($J/cm^3$) or more, in some embodiments about 3.0 $J/cm^3$, in some embodiments from about 4.0 $J/cm^3$ to about 10.0 $J/cm^3$, and in some embodiments, from about 4.5 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$.

Test Procedures

Capacitance:

The capacitance may be measured using a Keithley 3330 Precision LCZ meter with Kelvin Leads with 2.2 volt DC bias and a 0.5 volt peak to peak sinusoidal signal.

Equivalent Series Resistance (ESR):

Equivalence series resistance may be measured using a Keithley 3330 Precision LCZ meter with Kelvin Leads 2.2 volt DC bias and a 0.5 volt peak to peak sinusoidal signal. The operating frequency may be 100 kHz and the temperature may be room temperature.

Leakage Current:

Leakage current ("DCL") may be measured using a leakage test set that measures leakage current at room temperature and at the rated voltage after a minimum of 60 seconds.

Figure 3:
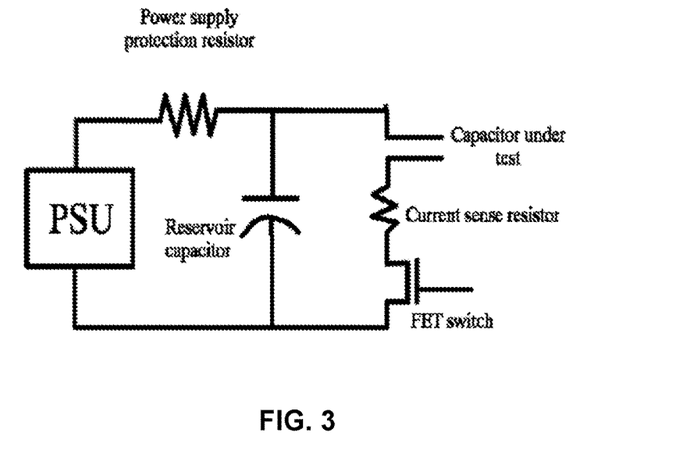
FIG. 3 illustrates an exemplary circuit for testing surge current.

Surge Current:

Surge current testing may be conducted at room temperature according to an article entitled "Surge in Solid Tantalum Capacitors", by John Gill. More particularly, surge testing may be performed using the circuit illustrated in FIG. 3. The test sequence is generally as follows:

(a) An individual capacitor is charged up to the voltage when the capacitor is shorted (started from rated voltage);

(b) The probes are brought down on the capacitor. The switching FET is off at this stage so that no current will flow;

(c) The FET is turned on, thus allowing a fast instantaneous peak surge current to flow and charge the capacitor. The peak surge current is equivalent to ~2× the rated voltage of the part. For example, a capacitor with a rated voltage of 50 volts will have a peak surge current of about 100 Amps;

(d) The current is monitored by a resistor (e.g., 0.18 ohm resistor) in the source log of the transistor, and the part is dynamically rejected if its current is still not falling after a predetermined time based on the capacitance;

(e) The FET is turned off to stop the charging process; and (f) Previous voltage and current before the capacitor shorted is recorded.

Breakdown Voltage:

Breakdown voltage testing may be conducted at room temperature. The test may be performed by charging an individual capacitor through the 10 kOhm resistor with 0.01 mAmps (charging slope dU/dt=1). When the applied voltage decreased more than 10%, the value of the breakdown voltage is recorded.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method of forming a high voltage solid electrolytic capacitor element, the method comprising:
    subjecting a sintered anode pellet to a formation profile to form an anode, wherein the formation profile includes subjecting the pellet to an increasing current so that a target forming voltage is achieved in about 30 minutes or less; and
    applying a solid electrolyte to the anode.

2. The method of claim 1, wherein the current is increased to a peak current, which is reached in about 30 minutes or less.

3. The method of claim 2, wherein the peak current ranges from about 1,000 to about 6,000 milliamps.

4. The method of claim 1, wherein the target forming voltage ranges from about 100 to about 500 volts.

5. The method of claim 1, wherein the formation profile further includes decreasing the current after the target forming voltage is achieved.

6. The method of claim 5, wherein the current is decreased at a non-linear rate.

7. The method of claim 5, wherein the target forming voltage is held at a relatively constant level as the current is decreased.

8. The method of claim 7, wherein the target forming voltage is held relatively constant for a period of time ranging from about 20 minutes to about 300 minutes.

9. The method of claim 1, wherein the solid electrolyte includes a conductive polymer.

10. The method of claim 1, wherein the solid electrolyte is formed by a process that includes applying a dispersion of conductive polymer particles to the anode.

11. The method of claim 10, wherein the conductive polymer particles include a substituted polythiophene.

12. The method of claim 11, wherein the conductive polymer particles have an average diameter of from about 1 to about 200 nanometers.

13. The method of claim 1, wherein the pellet is dipped into an electrolyte and thereafter subjected to the formation profile.

* * * * *